Feb. 19, 1935.  J. S. NEWMAN  1,991,983
MICROSCOPE SLIDE
Filed Aug. 25, 1932

Inventor
Joseph S. Newman
By Hull, Brock & West
Attorneys

Patented Feb. 19, 1935

1,991,983

UNITED STATES PATENT OFFICE 1,991,983

MICROSCOPE SLIDE

Joseph S. Newman, Cleveland Heights, Ohio

Application August 25, 1932, Serial No. 630,393

2 Claims. (Cl. 88—40)

This invention is an improved microscope slide having, in its particular field, certain pronounced advantages over the relatively fragile microscope slide of the conventional type. The improved slide was devised in connection with an inexpensive microscope outfit for use by young students and children.

Among the objects of the invention are to provide a very simple and cheap, yet efficient, easily handled and otherwise convenient mounting for microscopic subjects for examination under a microscope; to provide a microscope slide that is relatively unbreakable; to provide a microscope slide that, according to the preferred embodiment of the invention, is devoid of glass slip covers and may therefore be handled by children and other inexperienced persons without danger of injury to the user; to provide a microscope slide that will accommodate thicker objects than can be mounted in the ordinary slide, such objects as are available and would be interesting to the average child or young student; to provide a microscope slide that is of such a nature that objects may be quickly and easily mounted by anyone, and wherein the plate or body portion of the slide is of a material that will readily take type impressions and pencil and ink markings, thus facilitating the labeling of the slide.

Figure 1:
Figure 3:
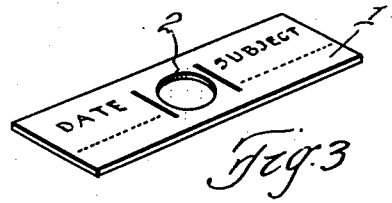
Figure 2:
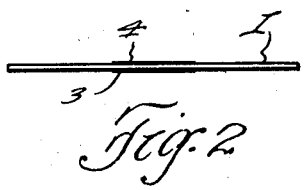
Figure 4:
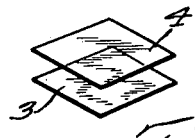
Figure 5:
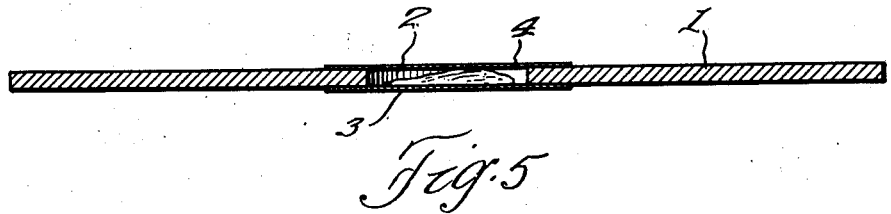

The foregoing objects and advantages, with others hereinafter appearing, are attained in the embodiment of the invention illustrated in the accompanying drawing forming a part hereof and wherein Fig. 1 is a plan, and Fig. 2 an edge elevation, of my improved microscope slide; Fig. 3 is a perspective view of the body portion or so-called "plate" of the slide; Fig. 4 is a similar view of the transparent slip covers, and Fig. 5 is a longitudinal section through the slide showing a subject mounted therein, the view being on a scale considerably enlarged over actual size.

The body portion or plate 1 of the slide consists of a piece of relatively unbreakable or non-fragile and desirably cheap material, such, for example, as a suitable grade of cardboard. It preferably corresponds in size and proportions to the ordinary microscope slide; and at its longitudinal center is formed with an aperture 2, as by punching. Suitable legend may be printed on the body portion or plate as, for instance, "Date" and "Subject"; and the student may fill in the appropriate information with pen or pencil.

While the ordinary thin glass slip covers may be employed in connection with the non-fragile body portion or plate 1, I prefer to use slip covers made of cellophane, celluloid, or other flexible transparent material, thus constituting on the whole an unbreakable unit which may be fabricated and handled by young and inexperienced persons without danger of their being injured. In making up a slide, one of the slip covers, designated 3, is secured by a suitable adhesive to one side of the body portion or plate 1 over the opening 2. The subject for examination may then be placed in the shallow depression formed by the opening and the underlying slip cover, and a second slip cover 4 is then similarly attached to the other side of the body porton or plate over the opening 2, due care being exercised to avoid scratching or otherwise marring the slip covers and to confine the adhesive to the marginal portions thereof.

When a slide with an object mounted therein as above described is placed upon the stage or slide-rest of a microscope and light is projected upwardly therethrough by the reflector below, the subject will be brilliantly illuminated owing to the transparency of the slip covers.

Objects of a thickness equal to or less than the body portion or plate may be readily accommodated between the slip covers, thus peculiarly adapting the slide to use by children and young students who do not have the facilities for obtaining very thin specimens, such as those to which the use of the ordinary glass plate microscope slide is restricted.

Owing to the ease with which common objects may be mounted, a young child or student may in a very short time provide himself with an interesting collection of slides for ready reference and to show to his friends.

Having thus described my invention, what I claim is:

1. A toy microscope slide comprising a body composed of cardboard, having a surface capable of receiving ordinary pen and pencil markings and having an opening therethrough and thin, flexible, transparent sheets adapted to be attached to the two sides of said slide in converging relation to said opening whereby to form a specimen compartment.

2. A toy microscope slide comprising a body composed of cardboard, having a surface capable of receiving ordinary pen and pencil markings and having an opening therethrough, and thin, flexible, transparent sheets secured by a suitable adhesive, one to each surface of said body and in covering relation to said opening.

JOSEPH S. NEWMAN.